3,494,969
PREPARATION OF STYRENES
George J. Kallos, Saginaw, Mich., assignor to The Dow Chemical Company, Midland, Mich., a corporation of Delaware
No Drawing. Filed July 17, 1968, Ser. No. 745,399
Int. Cl. C07c 15/10, 15/00, 25/28
U.S. Cl. 260—669
9 Claims

ABSTRACT OF THE DISCLOSURE

The vapor phase reaction of methyl chloride with toluene and substituted toluenes at elevated temperatures produces as the principal organic product a styrene corresponding to the starting toluene.

Background of the invention

The present invention is a novel method for making styrene and various substituted styrenes. The method is particularly useful for making certain substituted styrenes.

Styrene and substituted styrenes are valuable monomers for making various polymers and copolymers useful in the production of molded articles, latex paints, synthetic rubbers, coatings, and the like. Certain substituted styrenes are principally useful for making specialty plastics having modified properties such as resistance to burning, higher melting or softening points, decreased brittleness, and so on.

In the past, these monomers have usually been made by catalytic dehydrogenation of a corresponding ethyl-benzene or by oxidation of such an ethylbenzene to the acetophenone, reduction of the acetophenone to the alcohol, and dehydration of the alcohol. Particularly in the case of some substituted styrenes, both of the above known processes have serious disadvantages. Conventional dehydrogenation is impractical for making many substituted styrenes because of excessive loss through decomposition and other side reactions. The multistep oxidation-reduction-dehydration route has obvious economic handicaps. Additionally, one or more of the steps is likely to involve chemical difficulties, low yields, or other such disadvantage for a particular compound. There is an obvious need for an alternate, direct method for preparing these monomers.

Summary of the invention

It has now been found that when methyl chloride and a toluene compound of the formula

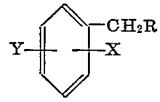

are contacted in the vapor phase at 550–1200° C., a reaction takes place of which the principal organic product is the corresponding styrene, i.e., the compound of the formula

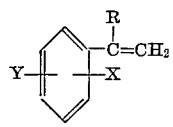

wherein R is H, CN, or phenyl and each of X and Y is H, $CH_3$, CN, F, Cl, or phenyl. A molar ratio of 0.5–40 moles of methyl chloride per mole of toluene compound is suitable. Contact or residence times up to about ten seconds may be employed depending upon the temperature.

Detailed description

While any ratio of methyl chloride within the above range can be used in the process, higher conversions are obtained without substantial loss of yield when an excess of methyl chloride over the toluene compound is employed, other conditions being the same. Ratios of 5–25 moles of methyl chloride per mole of toluene compound are preferred for best results.

Similarly, the broad reaction temperature range is effective with appropriate adjustment of contact or residence time in the reaction zone to obtain a desirable combination of conversion of toluene compound and yield of styrene. A preferred temperature range is 650–850° C.

Reactant residence time can be adjusted by varying the feed rates, by diluting the reaction mixture with more or less of an inert diluent, or by changing the volume of the reaction zone, for example, by employing a packed tube rather than an empty reaction tube. Preferably, the reaction mixture is diluted with an inert gas such as steam, nitrogen, argon, or carbon dioxide. The term inert is used here as meaning substantially unreactive in the present reaction under the outlined conditions. Average residence time for the mixture in the reaction zone is preferably 0.1–10 seconds, most preferably about 0.5–3 seconds, under preferred temperature conditions. At higher temperatures, for example at 1000–1200° C., residence times measured in microseconds may be desirable to avoid excessive decomposition reactions.

The reaction is preferably run at or about atmospheric pressure. Subatmospheric or moderate superatmospheric pressure may also be used. Since the reaction involves an increase of volume with the production of hydrogen chloride and other gaseous products such as methane along with the styrene compound, excessive pressure is undesirable.

Suitable materials for construction of the reactor include ceramic materials, silica, and other materials resistant to both heat and corrosion by HCl. Preferably, the reaction zone is filled with rings, balls, or other form of packing of a material such as listed for the reactor itself to facilitate turbulence and heat exchange, thereby providing more efficient operation. However, the process can also be run using an empty tube reactor.

The effluent reaction mixture comprises essentially hydrogen chloride, and the styrene compound together with more or less unreacted toluene compound and minor amounts of organic byproducts such as methane. The organic portion of the reactor effluent is easily separable by condensation and the hydrogen and hydrogen chloride can be piped to conventional separation and recovery systems or otherwise disposed of. The desired styrene product can be separated by distillation, extraction, or other known means from the rest of the organic effluent. Unreacted toluene starting material is similarly separable for recycle to the process or other use.

The following examples illustrate various modes of operating the present process as applied to different species of toluene compound and demonstrate the effects obtained by varying the reaction conditions within the above defined limits.

EXAMPLES 1–6

The reactor employed was a vertically disposed quartz tube 75 cm. long and having an inside diameter of 1.4 cm. It was packed with rings of high silica glass and heated by external electrical heaters with suitable temperature indicating and controlling means. The top part of the reactor was maintained at about 400° C. to serve as a vaporizer and preheater while the bottom 60 cm. was maintained at the reaction temperature. Feed materials were introduced into the top of the reactor through gas and liquid inlet ports and the bottom of the reactor was connected to a system providing continuous monitoring of the effluent reaction mixture by a mass spectrometer with other connections to cold traps where condensed effluent could be analyzed by vapor phase chromatography, infrared absorption, or other analytical means. In all experiments, mass spectrometric analysis of the total effluent product and gas chromatographic analysis of liquid effluent condensed at room temperature were combined to obtain figures for conversion and yield of the desired styrenes.

In the following examples, liquid ar-chlorotoluene consisting of a 60:40 mixture of the ortho and para isomers was metered into the top of the reactor at 16.0 g. per hour with gaseous methyl chloride and nitrogen feed rates adjusted to obtain various methyl chloride-chlorotoluene mole ratios and reactant residence times respectively. Each experiment was run for approximately five minutes to reach reaction equilibrium and then was continued under the same conditions for another 20–25 minutes to obtain analytical results. The data thereby obtained are summarized in the following table. Conversion refers to the amount of ar-chlorotoluene converted to other products while yields are calculated as the percent of converted ar-chlorotoluene appearing as ar-chlorostyrene.

TABLE

| Example No. | Reaction Temp., °C. | Mole ratio CH₃Cl/ ClOCH₃ | Res. Time, seconds | Conv., percent | Yield, percent |
|---|---|---|---|---|---|
| 1 | 660 | 6.5 | 3.8 | 18 | 50 |
| 2 | 750 | 6.6 | 1.37 | 10 | 75 |
| 3 | 750 | 14.6 | 1.35 | 19 | 75 |
| 4 | 750 | 23.7 | 1.37 | 24 | 75.5 |
| 5 | 750 | 13.1 | 1.8 | 30.6 | 66.7 |
| 6 | 760 | 23.2 | 1.2 | 19 | 82.5 |

EXAMPLE 7

Using the procedure of the foregoing examples, methyl chloride was reacted with 2-chloro-p-xylene using nitrogen as diluent to make 3-chloro-4-vinyltoluene. At a reaction temperature of 740° C., a feed rate of 16.2 g./hr. of 2-chloro-p-xylene, a mole ratio of 15:1 methyl chloride to chloroxylene, and a residence time in the reaction section of 1.37 seconds, 11.5% of the chloroxylene was converted and 86% of the converted material was obtained as 3-chloro-4-vinyltoluene.

EXAMPLE 8

Similarly, a nitrogen-diluted mixture of methyl chloride and diphenylmethane vapor in 9.5:1 molar ratio was reacted at 740° C. and a 1.35 seconds residence time using a diphenylmethane feed rate of 16 g./hr. to obtain a 10% conversion of diphenylmethane and a 66% yield of 1,1-diphenylethylene.

EXAMPLE 9

In the same way, toluene at 16.4 g./hr. was reacted with a 9.8:1 molar ratio of methyl chloride at 732° C. and a residence time of 1.47 seconds to obtain a 19.4% conversion of toluene and a 79% yield of styrene.

EXAMPLE 10

Under conditions otherwise the same as shown above, 15.8 g./hr. of p-xylene was reacted at 740° C. with a 12.5:1 molar ratio of methyl chloride to make a corresponding vinyltoluene product in similar yield and conversion. Some divinylbenzene was also formed.

EXAMPLE 11

Substantially as described in the foregoing examples, a nitrogen-diluted mixture of excess methyl chloride with ar-cyanotoluene was reacted at 740° C. to obtain similar conversion of cyanotoluene and yield of cyanostyrene.

EXAMPLE 12

The reactor was similar to that described in the foregoing examples except that the reaction zone consisted of an upper packed section and a lower unpacked section. With the preheater zone at 735° C. and the reaction zone at 845° C., a mixture of 4.61 g. moles per hour of methyl chloride and 10 g. moles per hour of steam was introduced into the preheater zone while 1.49 g. moles per hour of a 70:30 mixture of ortho and para chlorotoluenes was metered into the top of the reaction zone. These conditions provided a 3.1:1 molar ratio of methyl chloride to ar-chlorotoluene and a residence time of 0.54 second. Analysis of the effluent showed an ar-chlorotoluene conversion of about 21% with about 61% yield of the corresponding chlorostyrene isomers.

Similarly, methyl chloride is reacted with benzyl cyanide, ar-fluorotoluene, 4-methylbiphenyl, and ar-dichlorotoluene under conditions as outlined above to obtain comparable conversions and yields of α-cyanostyrene, ar-fluorostyrene, p-phenylstyrene, and ar-dichlorostyrene respectively.

I claim:

1. A method for making a vinylbenzene compound which comprises reacting by contacting in the vapor phase 0.5–40 moles of methyl chloride with a mole of a toluene compound of the formula

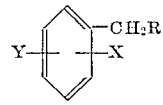

wherein R is H, CN, or phenyl and each of X and Y is H, CH₃, CN, F, Cl, or phenyl at a temperature of 550–1200° C.

2. The method of claim 1 wherein the methyl chloride-toluene compound reaction mixture comprises an inert diluent.

3. The method of claim 1 wherein the temperature is 650°–850° C.

4. The method of claim 1 wherein the molar ratio of methyl chloride to toluene compound is 5:1 to 25:1.

5. The method of claim 1 wherein R is H.

6. The method of claim 1 wherein the toluene compound is ar-chlorotoluene.

7. The method of claim 1 wherein the toluene compound is xylene.

8. The method of claim 1 wherein the toluene compound is toluene.

9. The method of claim 1 wherein the toluene compound is ar-chloroxylene.

References Cited

UNITED STATES PATENTS 3,219,711  11/1965  Borkowski et al.
3,303,229  2/1967  De Rosset.

FOREIGN PATENTS 686,722  5/1964  Canada.

DELBERT E. GANTZ, Primary Examiner

C. R. DAVIS, Assistant Examiner

U.S. Cl. X.R.

260—465, 650, 668

Disclaimer 3,494,969.—*George J. Kallos*, Saginaw, Mich. PREPARATION OF STYRENES. Patent dated Feb. 10, 1970. Disclaimer filed June 4, 1973, by the assignee, *The Dow Chemical Company*.

Hereby enters this disclaimer to claims 1, 3, 5 and 8 of said patent.

[*Official Gazette December 25, 1973.*]